(12) United States Patent
Price

(10) Patent No.: US 8,391,793 B2
(45) Date of Patent: Mar. 5, 2013

(54) SYSTEM AND METHOD FOR SECONDARY COMMUNICATION DEVICE DETECTION AND CONNECTION

(75) Inventor: Donald David Price, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 542 days.

(21) Appl. No.: 12/388,906

(22) Filed: Feb. 19, 2009

(65) Prior Publication Data

US 2010/0210211 A1    Aug. 19, 2010

(51) Int. Cl.
*H04B 7/00* (2006.01)

(52) U.S. Cl. ............... 455/41.3; 455/99; 340/539.13; 701/36

(58) Field of Classification Search ............. 340/539.13; 701/36; 455/41.3, 99
See application file for complete search history.

(56) References Cited

U.S. PATENT DOCUMENTS

| 2003/0032460 A1* | 2/2003 | Cannon et al. ............. 455/569 |
| 2004/0039505 A1 | 2/2004 | Vollmer et al. |
| 2005/0070272 A1* | 3/2005 | Marangos ............. 455/426.2 |
| 2005/0288837 A1* | 12/2005 | Wiegand et al. ............. 701/36 |
| 2006/0109107 A1* | 5/2006 | Staton et al. ............. 340/539.13 |

OTHER PUBLICATIONS

Ford Motor Company, "SYNC with Navigation System," Owner's Guide Supplement, SYNC System Version 1 (Jul. 2007).
Ford Motor Company, "SYNC," Owner's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC ," Owner's Guide Supplement, SYNC System Version 2 (Oct. 2008).
Kermit Whitfield, "A hitchhiker's guide to the telematics ecosystem", Automotive Design & Production, Oct. 2003, http://findarticles.com, pp. 1-3.
International Searching Authority, Patent Cooperation Treaty, The International Search Report and the Written Opinion for corresponding PCT/US2010/23580 mailed Apr. 1, 2010.

* cited by examiner

*Primary Examiner* — Edward Urban
*Assistant Examiner* — Hsin-Chun Liao
(74) *Attorney, Agent, or Firm* — Jennifer M. Stec; Brooks Kushman P.C.

(57) ABSTRACT

A method and apparatus for connecting a vehicle-based computing system to a wireless device are provided. When the vehicle-based computing system is powered, it may intially connect to a wireless device. If the system moves out of the range of that device, the connection may be lost. A secondary device may be present however, and automatic connection to that device may be desired so that the vehicle-based computing system can continue to function.

19 Claims, 5 Drawing Sheets

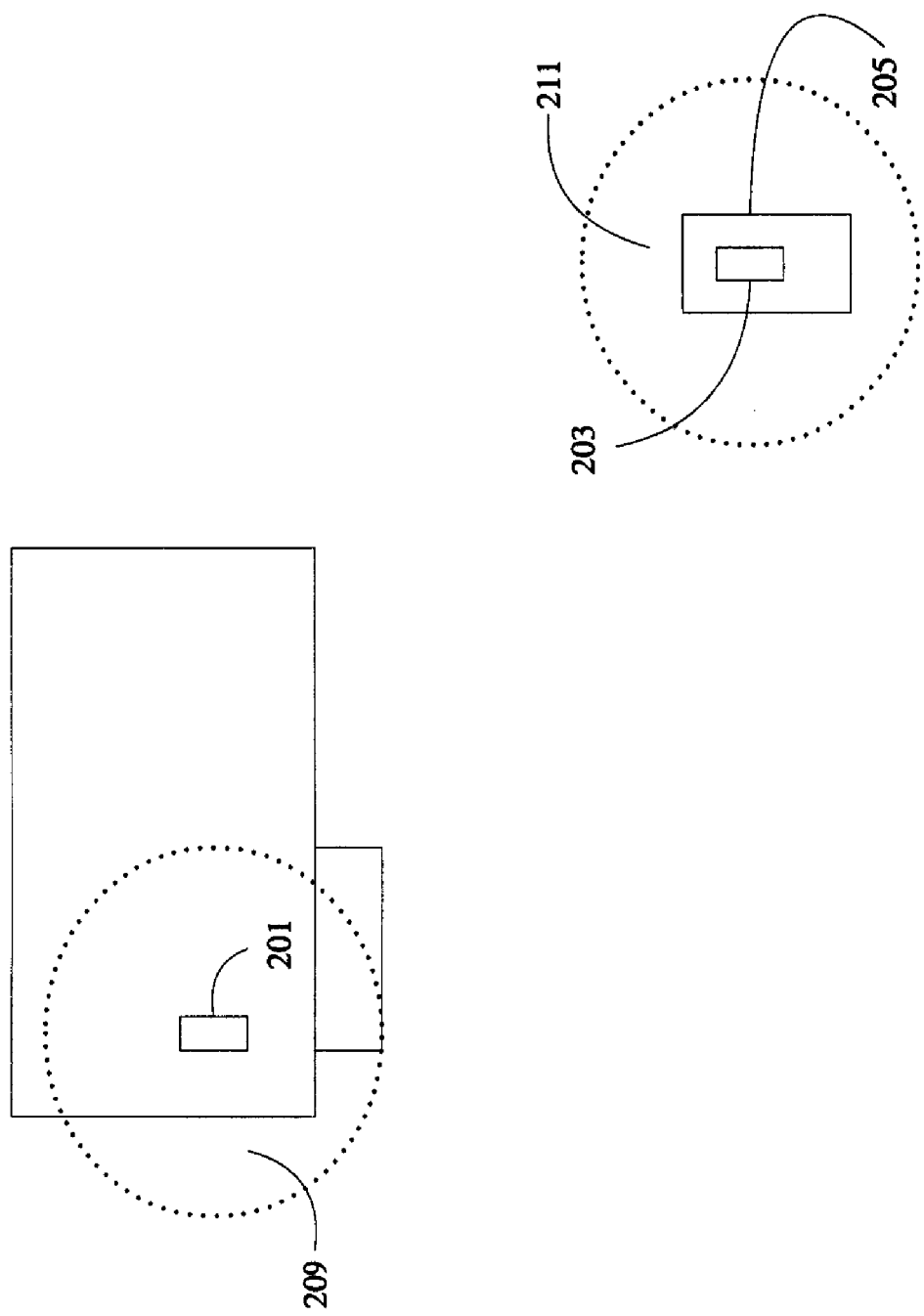

SYSTEM AND METHOD FOR SECONDARY COMMUNICATION DEVICE DETECTION AND CONNECTION

TECHNICAL FIELD

The illustrative embodiments generally relate to a system and method for automatic detection of and connection to a secondary communication device using a vehicle-based computing system.

BACKGROUND

Presently, vehicle-based computing systems exist that use an in-car wireless connection to a portable cellular phone or other nomadic device to communicate with an outside network. In some of these systems, the nomadic device is attached to the car itself. In these cases, the system may be instructed to communicate with that device and only that device, presenting no conflicts in communication.

In other systems, the connection may be made with one of a plurality of available devices. For example, in the FORD SYNC system, the vehicle-based computing system uses a Bluetooth connection to pair with a user's phone. Since there may be more than one driver of a vehicle, or there may be more than one phone with which pairing is desired, the user can configure a plurality of phones for use with the SYNC system.

As long as only one phone is within range of the system transceiver, this does not present a problem, as the system only has one choice of phones with which to connect. When a plurality of phones are available, however, the system may require instruction to determine which phone is to be used.

One possible solution is to prioritize phones. There can be a designated primary phone and even second, tertiary, etc. phones. If more than one paired phone (paired phones are phones that have been synchronized with the BlueTooth connection) is present, the system may choose a phone with which to connect by using preset prioritizations. But, for example, if a vehicle is in a garage, when it is started, it may be able to communicate with a high priority phone left inside a house. Then, when the vehicle leaves the range of communication with the connected stationary phone, the connection is lost, and a driver may have to manually instruct the vehicle to begin searching for a different phone.

SUMMARY OF ILLUSTRATIVE EMBODIMENTS

According to one illustrative embodiment, a vehicle communication system includes at least a computer processor in communication with a memory circuit. In addition, the communication system includes a local wireless transceiver in communication with the computer processor. The transceiver may also be configured to communicate wirelessly with a first wireless device and at least a second wireless device.

In this illustrative embodiment, if the processor determines that a communication connection between the transceiver and the first wireless device has been lost, the processor is operable to search for a signal from the first wireless device. This may help the system to determine if the first wireless device is still present.

The processor is also operable to determine if a movement event has occurred. In this illustrative embodiment, the movement event is a secondary signal that the vehicle may have moved out of range of a previously connected (e.g., first) wireless device.

Also, the processor is operable to search for a signal from the second wireless device. In this illustrative embodiment, if a signal from the second wireless device is found, and a signal from the first wireless device is not found, then the system has determined that the second device is available while the first device is not. Further, if a movement event has occurred, then the processor is operable to establish a connection to the second wireless device, since, in this illustrative embodiment, it is assumed that the vehicle has moved out of range of the first wireless device.

In another illustrative embodiment, the movement event can be any secondary event, depending on a desired testable situation. Since there may often be times when a signal to a first device is lost and a signal to a secondary device is present (e.g., temporary signal loss to a device), the secondary event, in this illustrative embodiment, is a measure to prevent flip-flopping between devices during temporary signal breaks.

BRIEF DESCRIPTION OF THE DRAWINGS

Other aspects and characteristics of the illustrative embodiments will become apparent from the following detailed description of exemplary embodiments, when read in view of the accompanying drawings, in which:

FIG. 2b shows the exemplary vehicle-based computing system of FIG. 2a having left the communication range of a primary Bluetooth device;

DETAILED DESCRIPTION OF ILLUSTRATIVE EMBODIMENTS

The present invention is described herein in the context of particular exemplary illustrative embodiments. However, it will be recognized by those of ordinary skill that modification, extensions and changes to the disclosed exemplary illustrative embodiments may be made without departing from the true scope and spirit of the instant invention. In short, the following descriptions are provided by way of example only, and the present invention is not limited to the particular illustrative embodiments disclosed herein.

Figure 1:
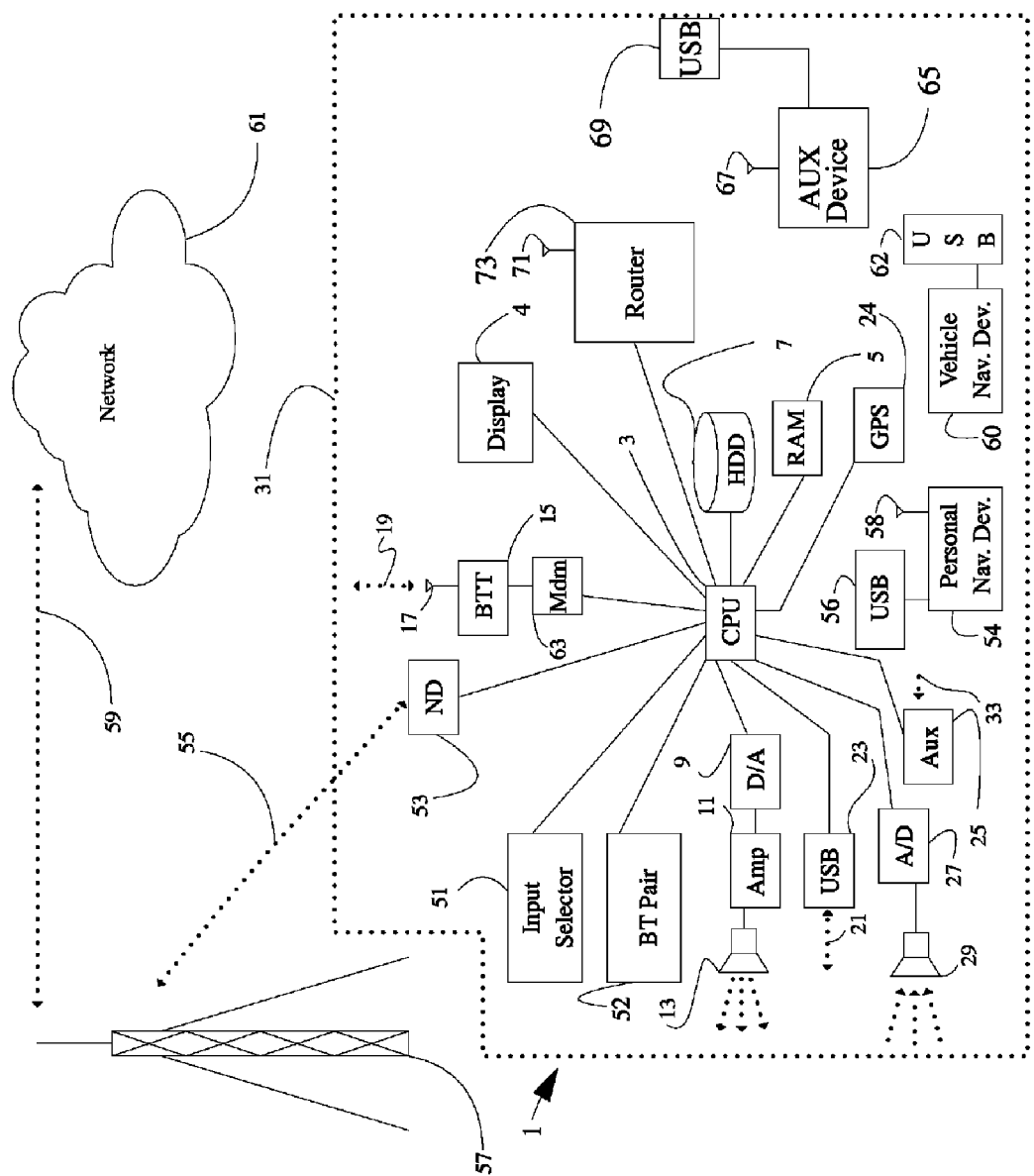
FIG. 1 shows an illustrative example of a vehicle-based computing system.

FIG. 1 illustrates system architecture of an illustrative onboard communication system usable for delivery of directions to an automobile. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BlueTooth device such as PND 54 or a USB device such as vehicle navigation device 60 along the bi-directional data streams shown at 19 and 21 respectively.

In one illustrative embodiment, the system 1 uses the BlueTooth transceiver 15 to communicate 17 with a user's nomadic device 53 (e.g., cell phone, smart phone, PDA, etc.). The nomadic device can then be used to communicate 59 with a network 61 outside the vehicle 31 through, for example, communication 55 with a cellular tower 57.

Pairing a nomadic device 53 and the BlueTooth transceiver 15 can be instructed through a button 52 or similar input, telling the CPU that the onboard BlueTooth transceiver will be paired with a BlueTooth transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 in order to transfer data between CPU 3 and network 61 over the voice band. In one illustrative embodiment, the processor is provided with an operating system including an API to communicate with modem application software. The modem application software may access an embedded module or firmware on the BlueTooth transceiver to complete wireless communication with a remote BlueTooth transceiver (such as that found in a nomadic device). In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is affixed to vehicle 31.

In one embodiment, incoming data can be passed through the nomadic device via a data-over-voice or data-plan, through the onboard BlueTooth transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Figure 2A:
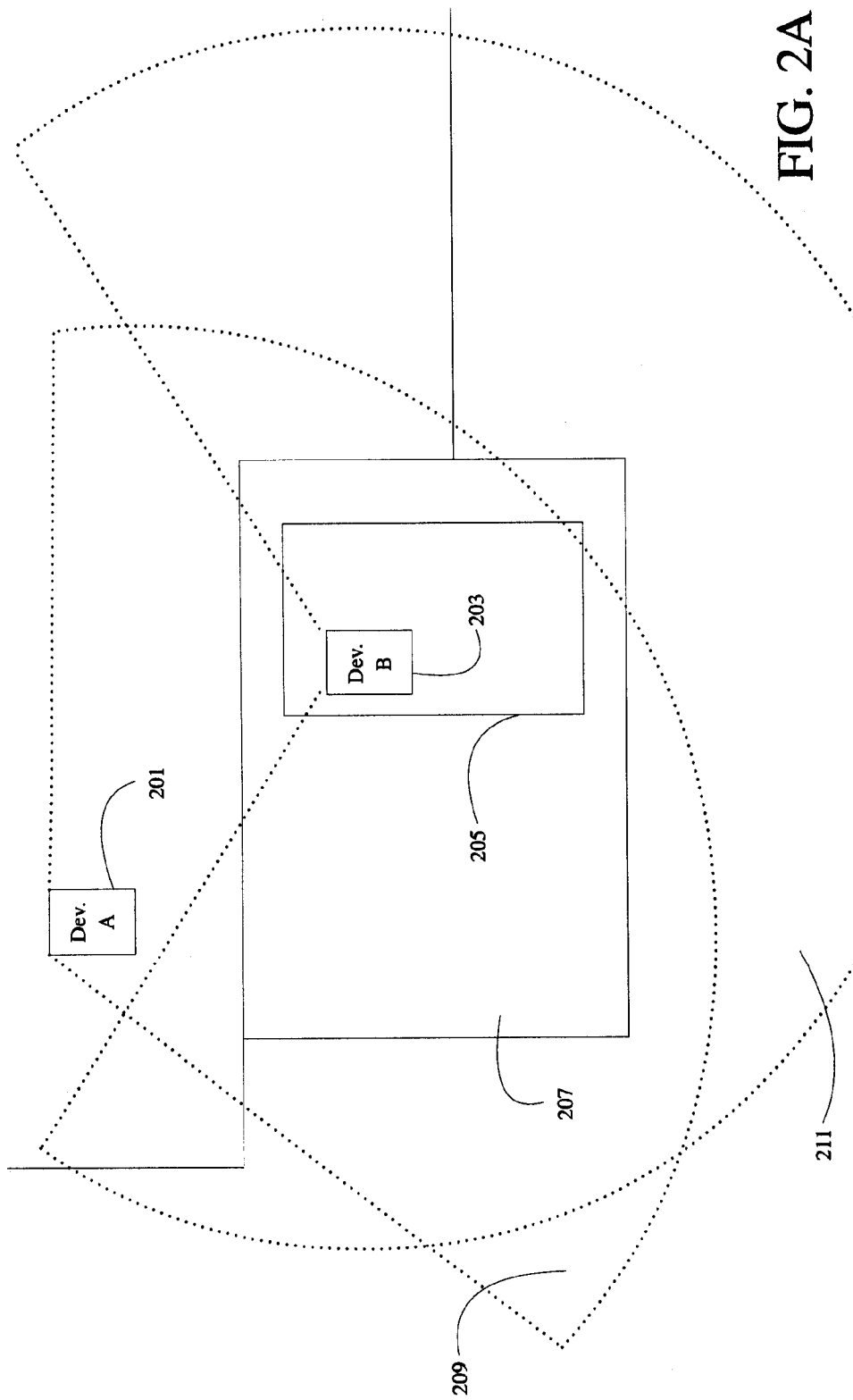
FIG. 2a shows an exemplary view of several Bluetooth devices in communication range with an exemplary vehicle-based computing system.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73. FIG. 2A shows an exemplary view of several Bluetooth devices in communication range with an exemplary vehicle-based computing system located in vehicle 205. More specifically, the vehicle 205 contains a transceiver (not shown) as part of a vehicle-based computing system. In FIG. 2A, the vehicle 205 is parked in a garage 207. Primary Bluetooth device 201 is inside the house attached to the garage. Bluetooth device 201 has a communication field 209 (partially shown). The communication field of Bluetooth device 201 encompasses the vehicle 205 and thus encompasses the vehicle transceiver. Accordingly, vehicle 205 recognizes device 201 as a possible device with which to communicate.

At the same time, a driver has entered the vehicle 205 with Bluetooth device 203 having communication field 211 (partially shown). Communication field 211 also encompasses the vehicle and the vehicle transceiver. Thus, the vehicle also recognizes secondary device 203 as a possible device with which to communicate.

At this point, there are a plurality of devices with which the vehicle can communicate. If both devices were physically present in the vehicle, the user would likely desire communication with the primary device 201. Here, however, primary device 201 is located in the home. When the user leaves the range of the primary device 201, the vehicle-based computing system will no longer be able to communicate with device 201, and the signal will be lost. FIG. 2B shows the exemplary vehicle-based computing system of FIG. 2A having left the communication range of a primary Bluetooth device. Since the devices 201, 203 were both in communicable range of the vehicle transceiver when the vehicle was powered up, as shown in FIG. 2A, the vehicle-based system entered into communication with the primary device. Once the vehicle 205 left the garage 207 and moved out of signal 209 range, however, the connection to the primary device is lost.

If no attempt to connect to a secondary device is made, the vehicle-based computing system will not be able to connect to a remote network, since it thinks a connection is still to be made through the previously connected primary device 201. Instead, it continues to look for the primary device, and, since the primary device is no longer in range, no connection can be made. The driver may be able to manually instruct a reconnection, but this can be potentially hazardous, depending on driving conditions.

Additionally, the driver may not know that the connection is not functioning properly until the device is needed. If directions, or some other important connection, such as an emergency call is needed, it may present a problem if the driver first has to manually re-establish connection to a second device.

According to at least one illustrative embodiment, when the connection to a device is lost, the vehicle-based system will perform one or more step to determine if the loss of connection was incidental or due to a situation as shown in FIGS. 2A and 2B.

Figure 3:
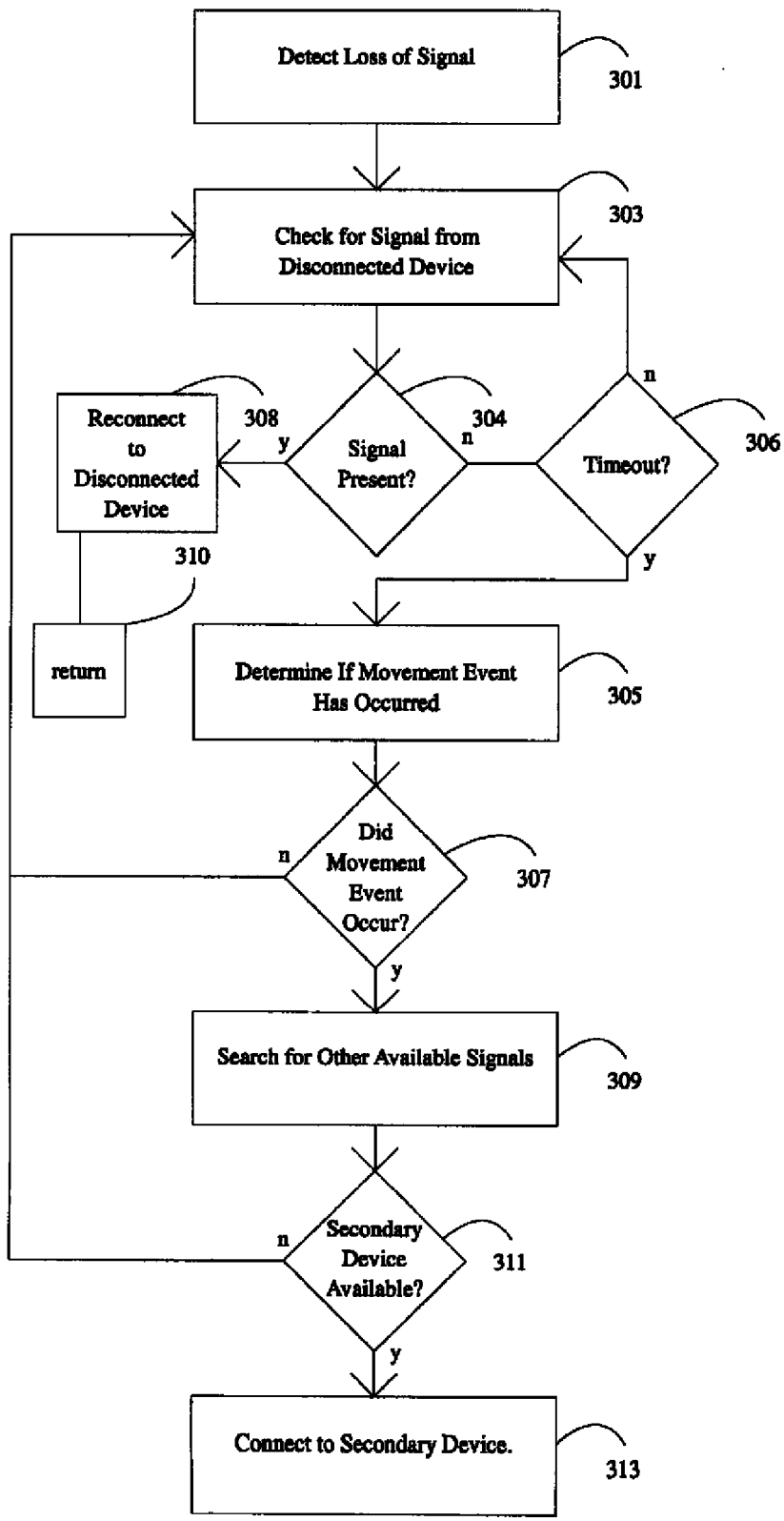
FIG. 3 shows an illustrative example of a process flow for detecting and connecting to a secondary communication device.

FIG. 3 shows an exemplary illustrative process for establishing that a device is missing and reconnecting to a secondary device. First, the vehicle-based computing system detects a loss of signal 301. Once the signal is determined to be lost, the system will first re-check for a signal from the disconnected device 303. In this embodiment, this process step will help ensure that the signal has not merely been temporarily lost, and that the primary (or other first-connected device) is not still within range and appropriate for connection. If a signal is present 304, the vehicle-based computing system will reconnect to the device with which communication was lost 308, and return to standard functionality 310.

If a signal is not present, the system will determine if a timeout has occurred 306. This allows some predefined window of time for re-checking for communication with the primary device. This can be useful if the signal is temporarily lost, or if the primary (or other, first-connected) device has been powered down and then powered up for any reason. If the timeout is not up, the system continues to check for the previous signal. If the timeout has occurred, then the system will check to see if a movement event has occurred 305.

A movement event can be defined in many ways. In at least one illustrative embodiment, the vehicle-based computing system determines if the vehicle has gone from a stationary state to a non-stationary state, as described with relation to FIG. 4. Other methods of detecting movement are also acceptable. For example, if it is the case that the signal was lost due to a power-down of the phone, the vehicle could have been moving the entire time. In this instance, the vehicle-based system may perform a detection that the vehicle has moved a certain distance since the signal was lost, or the system may simply rely on the fact that the timeout is up, regardless of whether the vehicle has moved at all (e.g., a first-connected device dies while the vehicle is waiting at a stop light or stuck in traffic).

In this illustrative embodiment, if a movement event has not occurred, the system will return to checking for a signal from a first-connected device. If the movement event has occurred 307, the vehicle-based computing system will check for other available signals. Presumably, these would be signals from secondary or tertiary paired devices that are present within a signal range. If an alternative device is available 311, the vehicle-based computing system will connect to the alternative device 313. If an alternative device is not available, then the vehicle-based computing system will return to search for a signal from the previously disconnected device.

Figure 4:
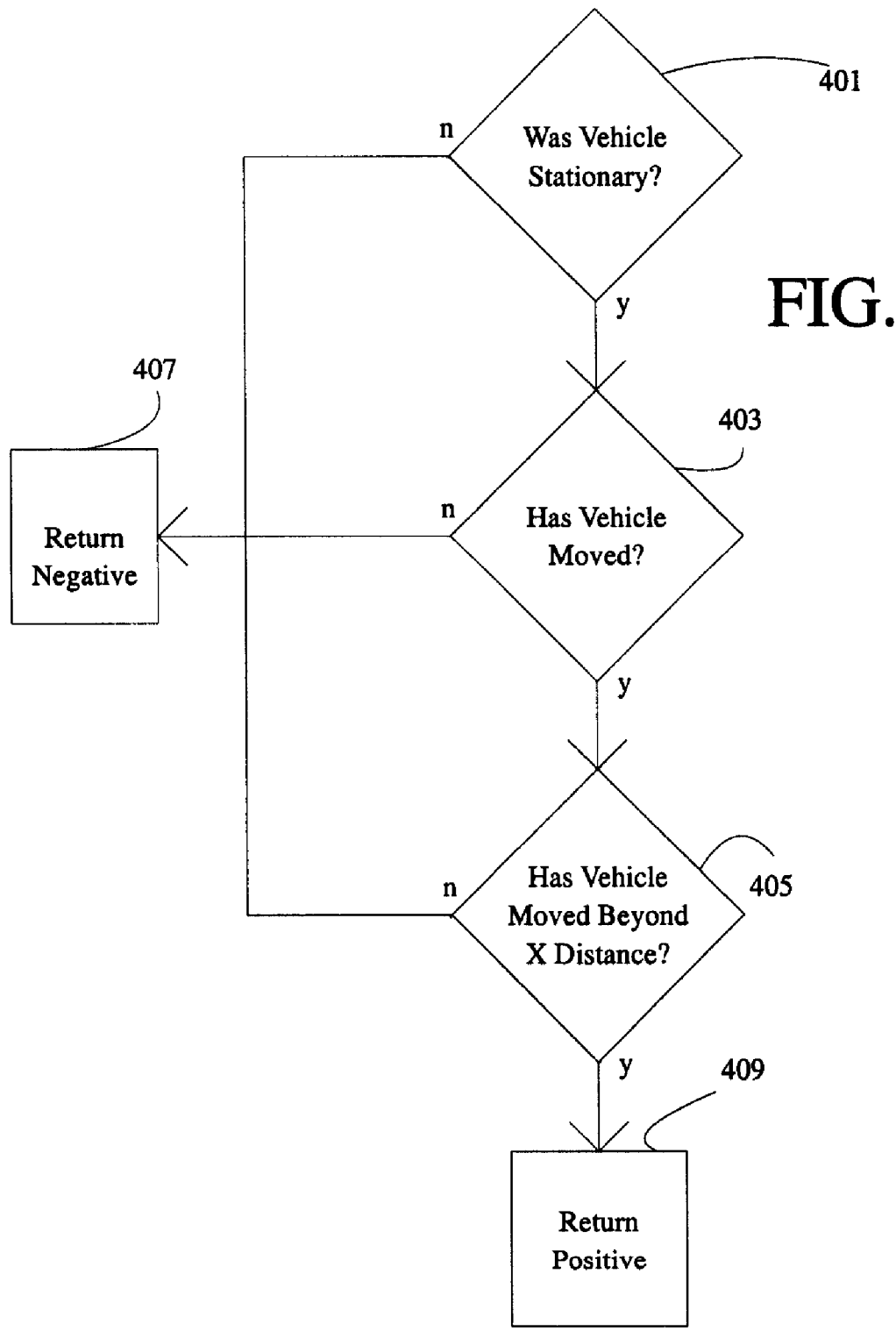
FIG. 4 shows an illustrative example of a process flow for detecting if a vehicle has changed motion states.

FIG. 4 shows an exemplary illustrative, non-limiting process for detecting vehicle movement. First, the vehicle-based system determines whether or not the vehicle was in a stationary state 401. In this illustrative embodiment, this detection may be made on a previous state of the vehicle. For example, a system register can record a stationary/non-stationary state of a vehicle when a signal is lost.

If the vehicle was not previously stationary within the designated timeframe (e.g., the vehicle stores a state for twenty seconds, and the vehicle has no record of a stationary state within the last twenty seconds), then, in this illustrative embodiment, the process returns a negative response 407, indicating that the vehicle was not previously in a stationary state, within the last N (i.e. the predefined time for state storage) minutes/seconds/etc. If the vehicle was in a stationary state, the process then determines if the vehicle has moved 403. For example, if the vehicle is in a stationary state and has not moved, but the signal has been lost, then there is a reasonable chance that the loss of signal was due to some event other than the vehicle moving out of a wireless range or the first-connected device. Accordingly, the process returns a negative result 407. If the vehicle has moved from a stationary state, however, there is a reasonable chance that the loss of signal is due to the vehicle moving out of wireless range. Accordingly, the process proceeds to check how far the vehicle has moved 405.

Again, if the vehicle has only moved a few feet, there is a reasonable likelihood that the loss of signal is due to something other than the vehicle moving out of range. If, however, the vehicle has moved beyond a certain distance (a known maximum wireless range, or other suitable predetermined number), then there is a fair chance that the loss of signal is due to the vehicle moving out of wireless range of the previously-connected device. Accordingly, the process returns a positive result 409, indicating that the vehicle was stationary and has now moved a certain distance from its previous stationary position.

This illustrative embodiment deals with the case where a vehicle is stationary, connected to a device not in the vehicle, and then moves a distance away from that stationary position, and out of range of the device. Numerous other reasons for prolonged disconnection from a first-connected device are anticipated, however, and this invention is not limited to addressing the exemplary situation described herein. Rather, all anticipated scenarios are to be covered, and it is within the scope of the invention to modify the exemplary processes shown herein to address the various possible scenarios. As previously noted, these modifications can include, but are not limited to, a system that skips the stationary-to-movement determination, and a system that skips movement detection altogether.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed:

1. A vehicle communication system comprising:
   a computer processor in communication with a memory circuit;
   a local wireless transceiver in communication with the computer processor and configured to communicate wirelessly with a first wireless device and at least a second wireless device;
   wherein, the processor is configured to:
   determine that a communication connection between the transceiver and the first wireless device has been lost; and
   search for a signal from the first wireless device upon loss of connection, for a predetermined period of time, and to reconnect with the first wireless device if a signal is found;
   wherein, if the predetermined period of time expires, the processor is configured to determine if a vehicle movement event has occurred based on the occurrence of at least one predetermined condition, and to search for a signal from the second wireless device; and
   wherein, if a signal from the second wireless device is found and a signal from the first wireless device is not found, and wherein if a vehicle movement event has occurred, the processor is configured to establish a connection to the second wireless device.

2. The system of claim 1, wherein the search for a signal from the first wireless device occurs for a fixed period of time, and wherein the processor is operable to establish a connection to the second wireless device after the fixed period of time has passed.

3. The system of claim 2, wherein the movement event comprises a vehicle transitioning from a stationary state to a moving state.

4. The system of claim 3, wherein, if the processor determines that the communication connection between the transceiver and the first wireless device has been lost, the processor is operable to instruct the storage of a movement state of the vehicle to the memory circuit.

5. The system of claim 4, wherein, after the fixed period of time has passed, the processor is operable to compare a stored movement state with a present movement state to determine if the vehicle has transitioned from a stationary state to a moving state.

6. The system of claim 5, wherein, if the processor determines that the communication connection between the transceiver and the first wireless device has been lost, the processor is operable to instruct the storage of an odometer value to the memory circuit.

7. The system of claim 6, wherein, after the fixed period of time has passed, the processor is operable to compare a present odometer value with a stored odometer value to determine how far the vehicle has traveled since the communication connection was lost.

8. The system of claim 2, wherein the movement event comprises a vehicle traveling a certain distance.

9. The system of claim 8, wherein, if the processor determines that the communication connection between the transceiver and the first wireless device has been lost, the processor is operable to instruct the storage of an odometer value to the memory circuit.

10. The system of claim 9, wherein, after the fixed period of time has passed, the processor is operable to compare a present odometer value with a stored odometer value to determine how far the vehicle has traveled since the communication connection was lost.

11. A method of automatic wireless device connection between a vehicle communication system and an alternative wireless device, the vehicle communication system including a computer processor in communication with a memory circuit, and a local wireless transceiver in communication with the computer processor and configured to communicate wirelessly with a primary wireless device and the alternative wireless device, the method comprising:
  determining that a communication connection between the transceiver and the primary wireless device has been lost;
  searching for a signal from the primary wireless device for a predetermined period of time;
  reconnecting to the primary wireless device if the signal is found;
  if the predetermined period of time has expired, determining if a vehicle movement event has occurred;
  searching for a signal from the alternative wireless device; and
  establishing a connection with the alternative wireless device, if a signal from the second wireless device is found and if a signal from the first wireless device is not found, and wherein if a vehicle movement event has occurred.

12. The method of claim 11, wherein the searching for a signal from the primary wireless device occurs for a fixed period of time, and wherein the establishing a connection to the alternative wireless device occurs after the fixed period of time has passed.

13. The system of claim 12, wherein the movement event comprises a vehicle transitioning from a stationary state to a moving state.

14. The system of claim 13, further including storing of a movement state of the vehicle to the memory circuit, if the communication connection between the transceiver and the first wireless device is determined to have been lost.

15. The system of claim 14, further including comparing a stored movement state with a present movement state to determine if the vehicle has transitioned from a stationary state to a moving state after the fixed period of time has passed.

16. The system of claim 15, further including storing an odometer value to the memory circuit, if the processor determines that the communication connection between the transceiver and the first wireless device has been lost.

17. The system of claim 16, further including comparing a present odometer value with a stored odometer value to determine how far the vehicle has traveled since the communication connection was lost.

18. The system of claim 12, wherein the movement event comprises a vehicle traveling a certain distance.

19. The system of claim 18, further including:
  storing an odometer value to the memory circuit, if the processor determines that the communication connection between the transceiver and the first wireless device has been lost; and
  comparing a present odometer value with a stored odometer value to determine how far the vehicle has traveled since the communication connection was lost, after the fixed period of time has passed.

* * * * *